A. FRISCH.
METHOD AND ARRANGEMENT FOR MEASURING THE POWER OF RECIPROCATING ENGINES.
APPLICATION FILED JUNE 17, 1919.
1,355,661.  Patented Oct. 12, 1920.
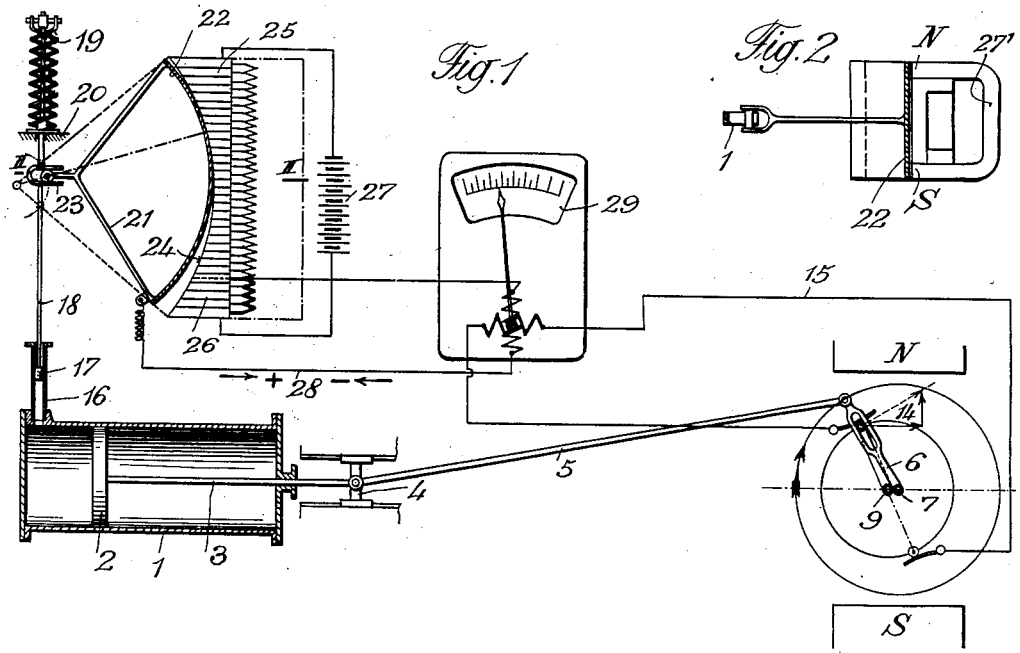
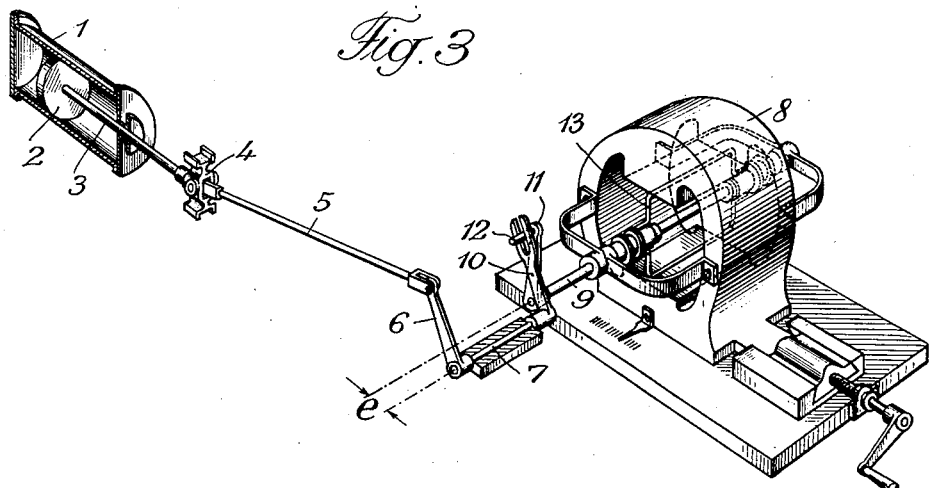
Inventor:
August Frisch,
By Henry Orth
Atty.

UNITED STATES PATENT OFFICE.

AUGUST FRISCH, OF ZURICH, SWITZERLAND.

METHOD AND ARRANGEMENT FOR MEASURING THE POWER OF RECIPROCATING ENGINES.

1,355,661.  Specification of Letters Patent.  Patented Oct. 12, 1920.

Application filed June 17, 1919. Serial No. 304,967.

*To all whom it may concern:*

Be it known that I, AUGUST FRISCH, a citizen of the Republic of Switzerland, residing at Zurich, Staffelstrasse 5, Switzerland, have invented certain new and useful Improvements in Methods and Arrangements for Measuring the Power of Reciprocating Engines; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in a method and an arrangement for measuring the power or output of reciprocating or piston engines.

As it is well known, the power or output of an engine comprising a reciprocating piston is usually measured by means of an indicator recording the changes of pressure taking place within the cylinder in a function of the piston-positions so that the indicated mean-pressure, and consequently the indicated output or power of the engine, can be determined by means of calculation.

The object of this invention is to provide a method and an arrangement which allow of measuring directly the indicated power or output of an engine comprising a reciprocating piston.

The method of measuring the output or power of a reciprocating engine according to this invention consists in transforming the speed of the piston into an electric quantity that changes its sign upon each reversal of stroke of the engine piston and the cylinder pressure coinciding temporarily with the piston speed into a second electric quantity of opposite sign for vacuum and in letting act said two electric quantities upon one another in a measuring instrument adapted to indicate the momentary product of the two electric quantities and therefore the output of the engine.

The arrangement for carrying out said method comprises an alternating current generator coupled to the crank shaft of the piston engine, the windings and magnets of this generator being so designed and arranged that the current generated by it, when it runs uniformly, is proportional to the sine of the angle of rotation of the crank and changes its direction at the moment at which the crank passes through the dead points. This current is thus proportional to the piston speed which varies also with the sine of the angle of rotation of the crank, when it is assumed that the connecting rod of the engine has an infinite length.

In order to obtain also a current proportional to the variable piston speed when the connecting rod has a finite length, coupling means may be provided between the crank and the alternating current generator, adapted to transmit the motion of said crank to the generator and admitting, in the sense of the bicentric method of Brix, a displacement of the shaft of the generator relatively to the crank shaft toward the cylinder of the piston engine. In this case the speed of the generator varies so that the current generated by the latter is proportional to the piston speed even when the connecting rod has a finite length.

This invention will now be more particularly described with reference to the accompanying drawings illustrating by way of example a construction of carrying out the invention. In these drawings:

Figure 1 shows diagrammatically an arrangement for measuring the output applied to a steam engine comprising a reciprocating piston;

Fig. 2 is a section on the line II—II of Fig. 1, and

Fig. 3 is a perspective view of some parts of the arrangement illustrated in Fig. 1.

Referring to the drawings, 1 denotes the cylinder of a steam engine comprising a reciprocating piston 2. The latter is connected to a crosshead 4 by means of a rod 3. A connecting rod 5 connects said crosshead 4 to a crank arm 6 fixed to a crank shaft 7. 8 denotes an alternating current generator designed as a dynamo and driven in a manner more fully described later on by the crank shaft 7. The windings and the magnets of this dynamo 8 are so designed and arranged that the current generated by it, when it runs uniformly, is proportional to the sine of the angle of rotation of the crank and changes its sign each time that the crank passes through a dead point. Consequently, this current varies even proportionally to the sine of the angle of rotation of the crank, when the connecting rod 5 has a finite length.

In order to obtain in the dynamo 8 also a current that is proportional to the variable piston speed when the length of the connecting rod is a finite one, the arrangement illustrated in the figures comprises between the crank 6 and the shaft 9 of the dynamo coupling means admitting a displacement in the sense of Brix's bicentric method of the dynamo 8 relatively to the crank shaft 7 toward the cylinder 1 of the piston engine. Said coupling means comprise two crank arms 10 and 11. The arm 10 is fixed to the shaft 7 of the engine crank 6 and it is adapted to take the arm 11 mounted on the shaft 9 of the dynamo along with it, so that upon a displacement of the shaft 9 relatively to the crank shaft 7 to an amount $e = \frac{r^2}{2l}$ wherein $r$ denotes the radius of the crank 6 and $l$ the length of the connecting rod 5, the pin 12 of the driven arm 11 is caused to slide in the fork-shaped end of the driving arm 10 relatively to the latter inward during the forward piston stroke and outward during the return piston stroke. In this way, a relatively retardated and accelerated rotary motion of such a kind is imparted to the arm 11 that the projection of the pin 12 onto a plane passing through the axes of the shafts 7, 9 and the dead points of the crank describes in equal spans of time distances that are proportional to the piston paths, the speed of said projection being thereby proportional to the piston speed. Thus, it will be evident, that in an electric conductor 13 (Fig. 3) assumed to move in a homogeneous magnetic field arranged at right angles to the plane just referred to, currents are generated which are proportional to the component of velocity 14 (Fig. 1) of the conductor acting at right angles to the direction of the lines of force, and consequently to the piston speeds, and which change their direction upon a reversal of stroke. The construction just described thus allows of transforming the piston speed into an electric current changing its sign upon each reversal of the piston stroke. The current generated in the dynamo 8 is supplied to a conductor 15.

To the cylinder 1 of the steam engine is fixed a branch 16 within which is mounted a movable indicator piston 17. Upon the lower face of this piston 17 acts the pressure existing in that portion of the cylinder 1 which is situated on the left hand side of the piston 2. Upon the upper end of the piston 17 acts the atmospheric pressure. The piston 17 is fixed to one end of a rod 18 to the second end of which is fixed one end of a spring 19. The second end of the latter is connected to a stationary part 20.

21 denotes an electric contact segment operatively connected at the center of its contact making surface 22 having the shape of an arc of circle to the rod 18 by means of fork 23, the rectilinear movement of the indicator piston 17 being transmitted proportionally and in an amplified manner by said rod 18 to the segment 21. The surface 22 of the segment 21 effecting the electric contact is adapted to roll on a circular surface 24 constituted by resistance elements 25, 26. The contact segment 21 is made of magnetic material and it is adapted to be pressed by a magnet $27^1$ (Fig. 2) against the contact element touching it, in order to effect a proper contact between said surface 22 and the resistance elements 25 and 26 respectively. In accordance with the pressure just present in the left portion of the cylinder 1 of the piston engine, the indicator piston 17 is lifted to a higher or a less higher level, the segment 21 being then caused to roll to an amount on the resistance elements 25, 26 corresponding to the vertical movement imparted to said rod 18. Each time that the segment 21 rolls on the resistance elements 25, 26 a certain number of them are connected to or disconnected from an electric circuit comprising a battery 27 and a conductor 28. Owing to this construction, the current influenced by the described contact device and passing through the conductor 28 varies proportionally to the pressure momentarily present beneath the indicator piston 17. The arrangement is thereby such that the segment 21 remains in contact with one of the resistance elements 25 until the pressure within the left portion of the cylinder 1 exceeds the atmospheric pressure. The current flows in this case from the battery 27 into the resistance elements 25 and passes at the point where the surface 22 of the segment 21 touches one of these elements 25 into said surface 22 from where it passes then in the direction indicated in Fig. 1, by →+ through the conductor 28 and the wattmeter 29, in order to flow finally through the resistance elements 26 back into the battery 27. When, on the other hand, the pressure in the left half of the cylinder falls below atmospheric pressure, the segment 21 coöperates with one of the resistance elements 26. The current flows in this case from the battery 27 into the resistance elements 25, passes then vertically down them and flows in the direction indicated in Fig. 1 by ←— through the conductor 28, and consequently through the wattmeter 29; from the latter the current flows into the surface 22 of the element 21 in order to pass from said surface 22 into that one of the resistance elements 26 which touches it. From the lowermost element 26 the current flows finally back into the battery 27.

The currents flowing through the conductors 15 and 28 act upon one another in a wattmeter 29 provided with an aperiodic damping device. As the current generated by the dynamo 8 is, as stated, proportional to the momentary piston speed, and as on the other hand, the current influenced by the contact segment is always proportional to the varying pressure existing beneath the indicator piston 17, it is evident, that the wattmeter 29 indicates as the mean-value of a series of products produced by the multiplication of the voltage of the current flowing through the conductor 15 and the intensity of the current flowing through the conductor 28, the indicated output or power of the steam engine. Said value may then indicate in accordance with the scale provided on the wattmeter, for instance the output per unity of surface, or the momentary whole output of the engine.

What I claim now as my invention is:

1. A method of measuring the power or output of reciprocating engines, consisting in transforming the piston speed into an electric quantity changing its sign upon each reversal of stroke of the engine piston and transforming the cylinder pressure momentarily coincident with the piston speed into a second electric quantity having an opposite sign for vacuum, and letting said two quantities act upon one another in a measuring instrument adapted to give the momentary product obtained by a multiplication of the two electric quantities and indicating consequently directly the power of the engine.

2. An arrangement for measuring the power of a reciprocating engine, comprising an alternating current generator, means adapted to couple said generator to the crank shaft of the reciprocating engine, the windings and the magnets of said generator being so designed and arranged that the current generated by said generator is, when it runs uniformly, proportional to the sine of the angle of rotation of the crank and changes its sign at the moment at which the crank passes through the dead points, said current being consequently proportional to the piston speed of the reciprocating engine varying also proportionally to the sine of the angle of rotation of the crank when the connecting rod of said engine has an infinite length, means for transforming the cylinder pressure of the reciprocating engine momentarily coincident with the piston speed into an electric current having an opposite sign for vacuum, and a wattmeter in which the current generated by the generator and the current into which is transformed the cylinder pressure are let to act upon one another, so that said wattmeter indicates directly at any time the power of the engine.

3. An arrangement for measuring the power of a reciprocating engine, comprising a dynamo, means arranged between the crank of the reciprocating engine and the shaft of the dynamo adapted to transmit the rotary motion of the crank to the shaft of the dynamo, said means admitting, in the sense of Brix's bicentric method, a displacement of the shaft of the dynamo relatively to the crank shaft of the reciprocating engine toward the cylinder of the latter in order to have regard to the finite length of the connecting rod of the engine, the angular velocity imparted to said dynamo varying then so that the current generated by the dynamo is even proportional to the piston speed when the connecting rod has a finite length, means for transforming the cylinder pressure of the reciprocating engine momentarily coincident with the piston speed into an electric current having an opposite sign for vacuum, and a wattmeter in which the current generated by the dynamo and the current into which is transformed the cylinder pressure are let to act upon one another, so that said wattmeter indicates directly at any time the power of the engine.

4. An arrangement for measuring the power of a reciprocating engine, comprising a dynamo, means arranged between the crank of the reciprocating engine and the shaft of the dynamo adapted to so transmit the rotary motion of the crank to the shaft of the dynamo that the current generated by the latter is at any time proportional to the piston speed of the engine, a movable member acted upon at one side by the pressure existing within the space at one side of the piston of the reciprocating engine, a source of electricity, a plurality of resistance elements adapted to be connected to the electric circuit comprising said source of electricity, a contact member operatively connected to said movable member and adapted to connect to or disconnect from said circuit, in accordance with the magnitude of the cylinder-pressure acting upon said movable member, a certain number of resistance elements so that the current flowing through the resistance elements intercalated into said electric circuit changes proportionally to the cylinder-pressure acting upon said movable member and changes also its signs when the pressure acting upon said movable member exceeds or falls below the atmospheric pressure, and a wattmeter in which the current generated by the dynamo and the current passing through the resistance elements intercalated in said electric circuit are let to act upon one another, so that said wattmeter indicates directly at any time the power of the engine.

5. An arrangement for measuring the power of a reciprocating engine, comprising a dynamo, means arranged between the crank of the reciprocating engine and the shaft of the dynamo adapted to so transmit the rotary motion of the crank to the shaft of the dynamo that the current generated by the latter is at any time proportional to the piston speed of the engine, a movable member acted upon at one side by the pressure existing within the space at one side of the piston of the reciprocating engine, a connecting member fixed to said movable member, a source of electricity, a plurality of resistance elements adapted to be connected to the electric circuit comprising said source of electricity; a contact segment adapted to roll on said resistance elements and having an arc shaped contact surface, a fork connecting the center of the arc shaped surface of the contact segment to said connecting member fixed to the movable member so that the rectilinear movement of the latter is transmitted proportionally and in an amplified manner to said contact segment which connects or disconnects, according to the movement imparted to it, a certain number of resistance elements from said electric circuit, so that the current flowing through the resistance elements intercalated into said electric circuit changes proportionally to the cylinder pressure acting upon said movable member and changes also its signs when the pressure acting upon said movable member exceeds or falls below the atmospheric pressure, and a wattmeter in which the current generated by the dynamo and the current passing through resistance elements intercalated in said electric circuit are let to act upon one another, so that said wattmeter indicates directly at any time the power of the engine.

6. An arrangement for measuring the power of a reciprocating engine, comprising a dynamo, means arranged between the crank of the reciprocating engine and the shaft of the dynamo adapted to so transmit the rotary motion of the crank to the shaft of the dynamo that the current generated by the latter is at any time proportional to the piston speed of the engine, a movable member acted upon at one side by the pressure existing within the space at one side of the piston of the reciprocating engine, a connecting member fixed to said movable member, a source of electricity, a plurality of resistance elements adapted to be connected to the electric circuit comprising said source of electricity, a contact segment of magnetic material adapted to roll on said resistance elements and having an arc shaped contact surface, a magnet adapted to press said contact segment against the resistance elements, a fork connecting the center of the arc shaped surface of the contact segment to said connecting member fixed to the movable member so that the rectilinear movement of the latter is transmitted proportionally and in an amplified manner to said contact segment which connects or disconnects, according to the movement imparted to it, a certain number of resistance elements from said electric circuit, so that the current flowing through the resistance elements intercalated into said electric circuit changes proportionally to the cylinder pressure acting upon said movable member and changes also its sign when the pressure acting upon said movable member exceeds or falls below the atmospheric pressure, and a wattmeter in which the current generated by the dynamo and the current passing through the resistance elements intercalated in said electric circuit are let to act upon one another, so that said wattmeter indicates directly at any time the power of the engine.

In testimony that I claim the foregoing as my invention, I have signed my name.

AUGUST FRISCH.